(12) United States Patent
Li et al.

(10) Patent No.: US 12,167,499 B2
(45) Date of Patent: Dec. 10, 2024

(54) CONNECTIVITY ENHANCEMENT

(71) Applicant: Apple Inc., Cupertino, CA (US)

(72) Inventors: Qiming Li, Beijing (CN); Hua Li, Biejing (CN); Rui Huang, Beijing (CN); Jie Cui, Santa Clara, CA (US); Yang Tang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/289,637

(22) PCT Filed: Oct. 28, 2019

(86) PCT No.: PCT/US2019/058276
§ 371 (c)(1),
(2) Date: Apr. 28, 2021

(87) PCT Pub. No.: WO2020/092199
PCT Pub. Date: May 7, 2020

(65) Prior Publication Data
US 2021/0400468 A1 Dec. 23, 2021

Related U.S. Application Data

(60) Provisional application No. 62/752,245, filed on Oct. 29, 2018.

(51) Int. Cl.
*H04W 8/24* (2009.01)
*H04W 72/51* (2023.01)
(Continued)

(52) U.S. Cl.
CPC ............. *H04W 8/24* (2013.01); *H04W 72/51* (2023.01); *H04W 76/15* (2018.02); *H04W 88/06* (2013.01)

(58) Field of Classification Search
CPC ..... H04W 48/14; H04W 48/16; H04W 76/15; H04W 48/12; H04W 35/02; H04W 48/17; H04W 48/00; H04W 36/02; H04L 5/0048
(Continued)

(56) References Cited

U.S. PATENT DOCUMENTS

| 7,957,349 B2 * | 6/2011 | Kim ...................... H04W 36/02 |
| | | 370/331 |
| 8,730,942 B2 * | 5/2014 | Stille ................... H04L 65/1101 |
| | | 370/352 |

(Continued)

FOREIGN PATENT DOCUMENTS

| CN | 104584463 A | * | 4/2015 | ............ H04W 24/10 |
| EP | 3449668 B1 | * | 9/2020 | ........... H04L 5/0048 |

(Continued)

OTHER PUBLICATIONS

H. Shariatmadari, S. Iraji, R. Jantti, P. Popovski, Z. Li and M. A. Uusitalo, "Fifth-Generation Control Channel Design: Achieving Ultrareliable Low-Latency Communications," in IEEE Vehicular Technology Magazine, vol. 13, No. 2, pp. 84-93, Jun. 2018, doi: 10.1109/MVT.2018.2814378. (Year: 2018).*

(Continued)

*Primary Examiner* — William D Cumming
(74) *Attorney, Agent, or Firm* — Sterne, Kessler, Goldstein & Fox P.L.L.C

(57) ABSTRACT

Methods, systems, and storage media described herein may have the complexity to support simultaneous communications (e.g., transmission/reception to/from) with two or more cells. Therefore, before configuring a handover, the network needs to know if these methods, systems, and storage media can support simultaneous communication with multiple cells or not. Among other things, these methods, systems, and storage media can reduce the interruption time during (Continued)

handovers for when these methods, systems, and storage media are capable of such simultaneous communication.

19 Claims, 7 Drawing Sheets

(51) Int. Cl.
*H04W 76/15* (2018.01)
*H04W 88/06* (2009.01)

(58) Field of Classification Search
USPC .................................................. 370/331, 332
See application file for complete search history.

(56) References Cited

U.S. PATENT DOCUMENTS

| | | | | |
|---|---|---|---|---|
| 8,942,750 | B2* | 1/2015 | Marquez | H04W 52/40 |
| | | | | 455/522 |
| 10,098,059 | B2* | 10/2018 | Ly | H04W 48/16 |
| 10,477,466 | B2* | 11/2019 | Ly | H04W 48/14 |
| 10,498,500 | B2* | 12/2019 | Rahman | H04L 12/28 |
| 10,790,896 | B2* | 9/2020 | Li | H04B 7/0626 |
| 10,993,176 | B2* | 4/2021 | Ly | H04W 48/00 |
| 11,018,748 | B2* | 5/2021 | Li | H04B 17/17 |
| 11,019,655 | B2* | 5/2021 | Yiu | H04W 48/12 |
| 2008/0069053 | A1* | 3/2008 | Kim | H04W 36/02 |
| | | | | 370/332 |
| 2009/0010247 | A1* | 1/2009 | Stille | H04L 65/103 |
| | | | | 370/352 |
| 2012/0178493 | A1* | 7/2012 | Marquez | H04W 52/40 |
| | | | | 455/522 |
| 2017/0318522 | A1* | 11/2017 | Ly | H04W 48/16 |
| 2018/0167933 | A1 | 6/2018 | Yin et al. | |
| 2018/0359687 | A1* | 12/2018 | Ly | H04W 48/16 |
| 2019/0053271 | A1* | 2/2019 | Islam | H04W 74/0833 |
| 2019/0268061 | A1* | 8/2019 | Li | H04B 17/17 |
| 2020/0037235 | A1* | 1/2020 | Ly | H04L 5/0048 |
| 2020/0053716 | A1 | 2/2020 | Xu et al. | |
| 2020/0395994 | A1* | 12/2020 | Li | H04B 7/0695 |
| 2021/0153109 | A1* | 5/2021 | Ly | H04W 48/16 |
| 2021/0400468 | A1* | 12/2021 | Li | H04W 8/24 |

FOREIGN PATENT DOCUMENTS

| | | | |
|---|---|---|---|
| WO | WO-2017189118 A1 * | 11/2017 | H04L 5/0048 |
| WO | WO 2018-057076 A1 | 3/2018 | |
| WO | WO 2018-174624 A1 | 9/2018 | |

OTHER PUBLICATIONS

L. Valcarenghi, K. Kondepu, F. Giannone and P. Castoldi, "Requirements for 5G fronthaul," 2016 18th International Conference on Transparent Optical Networks (ICTON), 2016, pp. 1-5, doi: 10.1109/ICTON.2016.7550569. (Year: 2016).*

English translation of CN-104584463-A, Oct. 2023 (Year: 2023).*

CATT, "Discussion on resource allocation mechanism in NR V2X", R1-1810542, 3GPP TSG RAN1 Meeting #94bis, Sep. 29, 2018, 7 pages.

Huawei et al., "Remaining issues on LTE-NR coexistence", R1-1810114, 3GPP TSG RAN WG1 Meeting #94bis, Sep. 29, 2018, 6 pages.

International Search Report and Written Opinion of the International Searching Authority directed to related International Patent Application No. PCT/US2019/058276, mailed Feb. 14, 2020, 9 pages.

RAN2 et al., LS on UE capability clarification for simultaneousRxTx for NR, R4-1800015, 3GPP TSG RAN WG4 #AHS, 3GPP, Jan. 10, 2018, 2 pages.

Huawei et al., DC based NR scheme for 0ms interruption handover, R2-1710266, 3GPP TSG RAN WG2 #99bis, 3GPP, Sep. 29, 2017, 7 pages.

NTT Docomo, Inc. NR WI in the October meeting 2017, R2-1712305, 3GPP TSG RAN WG2 #100, 3GPP, Nov. 17, 2017, 101 pages.

RAN WG4 et al., UE capability clarification for simultaneousRxTx for NR, R2-1809441, 3GPP TSG RAN WG2 #AHS, 3GPP, Jun. 20, 2018, 1 page.

Interdigital Inc., NR—UE Power Class definition for cmW and mmW ranges, R4-1704531, 3GPP TSG RAN WG4 #83, 3GPP, May 5, 2017, 3 pages.

* cited by examiner

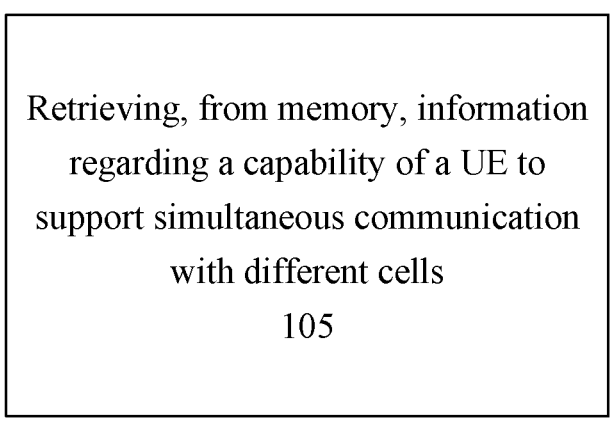
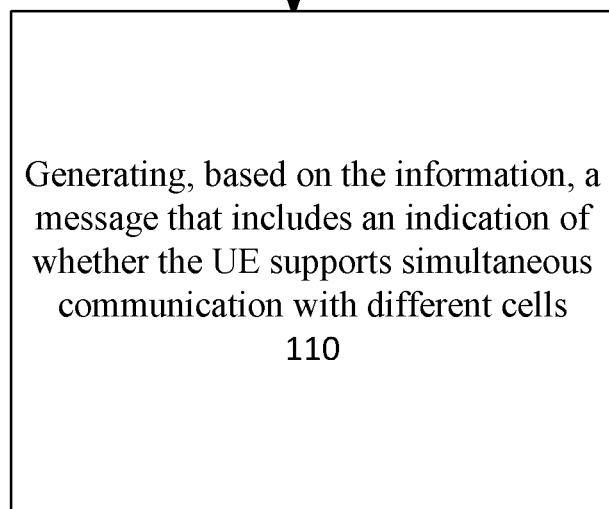
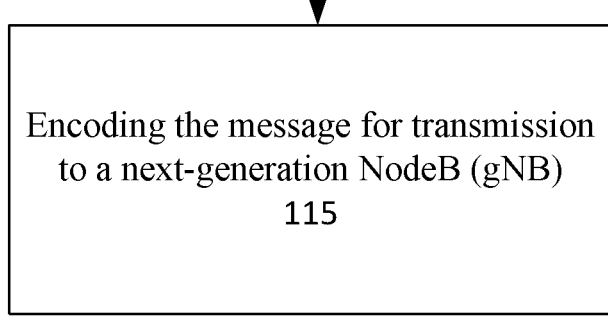
FIG. 1

```
                    ┌─────────────────────────┐
                    │ Receiving a first       │
                    │ message from a user     │
                    │ equipment (UE) that     │
                    │ includes an             │
                    │ indication of whether   │
                    │ the UE supports         │
                    │ simultaneous            │
                    │ communication with      │
                    │ different cells         │
                    │ 205                     │
                    └─────────────────────────┘
                                │
                                ▼
                    ┌─────────────────────────┐
                    │ Generating, based on    │
                    │ the indication of       │
                    │ whether the UE supports │
                    │ simultaneous            │
                    │ communication with      │
                    │ different cells, a      │
                    │ second message that     │
                    │ includes configuration  │
                    │ information for a       │
                    │ handover to be          │
                    │ performed by the UE     │
                    │ 210                     │
                    └─────────────────────────┘
                                │
                                ▼
                    ┌─────────────────────────┐
                    │ Encoding the second     │
                    │ message for             │
                    │ transmission to the UE  │
                    │ 215                     │
                    └─────────────────────────┘
```

FIG. 2

300 
Generating a message that includes an indication of whether a UE supports simultaneous communication with different cells
305
Encoding the message for transmission to a next-generation NodeB (gNB)
310
FIG. 3

CONNECTIVITY ENHANCEMENT

RELATED APPLICATION

This application is a National Phase in the United States of PCT Application No. PCT/US2019/058276, filed on Oct. 28, 2019, which claims priority to U.S. Provisional Patent Application No. 62/752,245, filed Oct. 29, 2018, each which is incorporated by reference in its entirety.

FIELD

Embodiments of the present invention relate generally to the technical field of wireless communications.

BACKGROUND

Among other things, embodiments described herein are directed to connectivity enhancements between a user equipment (UE) and a network. Embodiments of the present disclosure may be used in conjunction new radio (NR) and long term evolution (LTE) systems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1 and 2, and 3 illustrate examples of operation flow/algorithmic structures in accordance with some embodiments.

DETAILED DESCRIPTION

Figure 4:
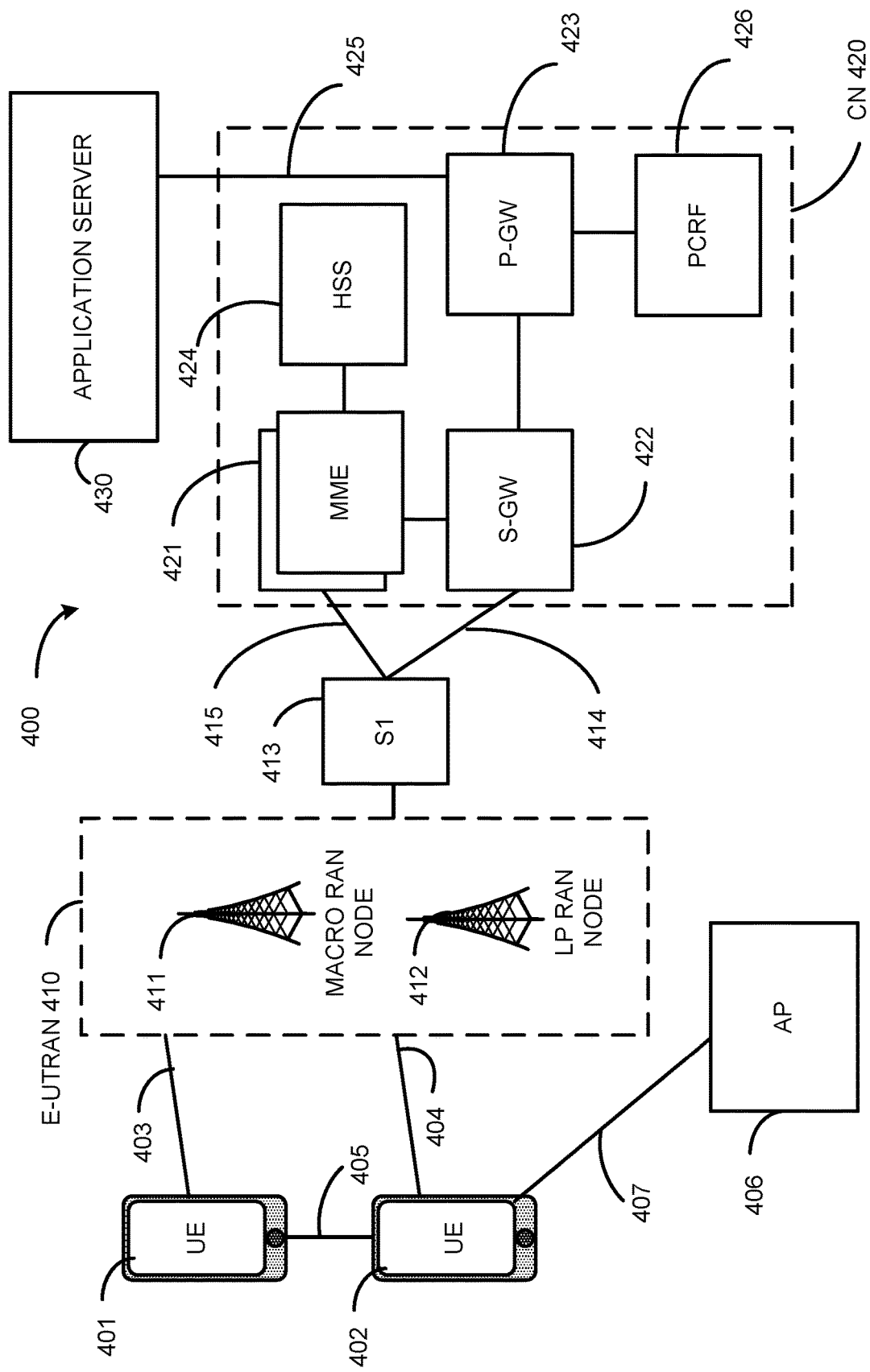
FIG. 4 depicts an architecture of a system of a network in accordance with some embodiments.

Embodiments discussed herein may relate to connectivity enhancements between a UE and network. Other embodiments may be described and/or claimed.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like may refer to the same, or different, embodiments. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Examples of embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Examples of embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

In legacy handover operations for long term evolution (LTE) systems, a user equipment (UE) drops the connection to source cell after the handover command is received and then tries to connect to the target cell. There may be some interruption time during this procedure (e.g., after a handover command is received and before UE can start operations in the target cell). In order to reduce the interruption time associated with, for example, LTE, NR, RACH-less handover, Make-Before-Break handover, or other situations, one possible solution in accordance with embodiments of the present disclosure is that the UE maintains a connection to the source cell until the UE can start data transmission/reception to/from the target cell. In some embodiments, the UE may be able to support simultaneous transmission/reception to/from both cells in NR or LTE systems.

In some embodiments, some (but not necessarily all) UEs may have the complexity to support simultaneous communications (e.g., transmission/reception to/from) with two or more cells. For example, some aspects that may need to be addressed especially for two intra-frequency cells (or intra-band cases) include AGC, timing, beamforming, mixed numerologies and other factors. Therefore, before configuring a handover, the network needs to know if a particular UE can support simultaneous communication with multiple cells or not. Among other things, embodiments of the present disclosure help reduce the interruption time during handovers for UEs capable of such simultaneous communication.

Embodiment 1: Introduce New Per-UE Capability if the UE can Support Simultaneous Transmission/Reception to/from Different Cells In some embodiments, unlike a coordinated multi-point (CoMP) operation, a per-UE capability may be used to indicate to a network if the UE can support simultaneous transmission/reception for different packages from different cells, typically in a handover procedure.

In this example, the capability may include multiple indications to cover different scenarios, such as the capability of the UE for: intra-frequency and inter-frequency communications, intra-band and inter-band communications, FR1 (sub 6 GHz) and FR2 (mmWave) communications, communications involving unified numerology and mixed numerologies, as well as other capabilities.

In cases where a UE supports simultaneous transmission/reception to/from two intra-frequency cells (or a similar intra-band case), the UE may need to use one RF chain to handle the transmission/reception to/from the two cells. In some cases, a bottleneck may occur due to an AGC issue. For example, if the power offset is quite large (e.g. larger than 8 dB), it may be challenging for all the UEs to successfully receive the data from the two cells. Note that there are so many categories UE supported in LTE (also NR as well in future). Some low cost/complexity UE may not be able to support this due to limited HW and SW resource.

In other cases, a bottleneck may occur due to a timing issue. For example, a UE may usually observe different timing from different cells, and it is not a typical implementation to maintain two sets of timing advance using one or two RF chains for the two intra-frequency cells. However, keeping transmissions based on one cell's timing may lead to the degradation of uplink performance of the other cell.

A bottleneck may also occur due to a beamforming issue. For example, in order to overcome the path-loss at high frequency ranges, both a UE and base station need to use spatial beamforming at transmission and reception, which can be achieved by using antenna panel. However, due to the cost and implementation complexity, some UEs may not support multiple Rx/Tx beams simultaneously from/to single or multiple cells.

A bottleneck may also occur due to mixed numerologies. For example, if two cells have different numerologies, not all the UEs may necessarily support data transmission/reception with different numerologies. There could be further limitations, and not all UEs operating in a network may necessarily support simultaneous communications with multiple cells. Accordingly, before configuring a handover, the network needs to know if this UE can support such simultaneous communications or not.

In some embodiments, a UE may indicate its capability using a Boolean variable, where a "TRUE" value indicates the UE can support simultaneous transmission/reception to/from different cells, and FALSE means UE cannot support simultaneous transmission/reception to/from different cells. In a handover procedure, for example, the term "different cells" may include "a source cell and target cell." An example of a Boolean variable that may be used in conjunction with some embodiments is shown below in Table 1.

TABLE 1

| | | | |
|---|---|---|---|
| simultaneousRxTxfromSourceCellAndTargetCell Indicates whether the UE supports simultaneous transmission and/or reception to/from source cell and target cell during handover. | UE | No Yes | Yes |

Embodiments 2-5 (described in more detail below) may utilize separate information elements (IEs) indicating a UE's capability in different scenarios. These embodiments may be used alone or jointly. For instance, jointly considering embodiments 2 and 4, a new capability may be introduced to indicate if UE can support simultaneous transmission/reception to/from different cells on the same carrier frequency (or on the same frequency band) in FR1. The capability of simultaneous Tx/Rx can be further split into two parts (e.g. one for simultaneous Tx and the other for simultaneous Rx).

Embodiment 2: Introduce New Per-UE Capability if the UE Supports Simultaneous Transmission/Reception to/from Different Cells (or with Different Tx/Rx Beams) in FR2 (or in mmWave)

In some embodiments, the UE may indicate whether the UE can generate multiple Tx/Rx directions in a given time. This feature can be used for handovers, as well as for a carrier aggregation/dual connectivity (CA/DC) operation, wherein both cells are serving cells. The new capability could be indicated by the indicator examples shown below in Tables 2, 3, or 4:

TABLE 2

| | | | |
|---|---|---|---|
| simultaneousMultipleBeams Indicates whether the UE supports multiple different Tx and/or Rx beams simultaneously | UE | No | No Yes |

TABLE 3

| | | | |
|---|---|---|---|
| simultaneousTwoBeams Indicates whether the UE supports two different Tx and/or Rx beams simultaneously | UE | No | No Yes |

TABLE 4

| simultaneousMultipleBeams Indicates whether the UE supports transmission and/or reception to/from different directions | UE | No | No | Yes |
|---|---|---|---|---|

Embodiment 3: Introduce New Per-UE Capability if the UE Supports Simultaneous Transmission/Reception to/from Different Cells with Different Uplink and Downlink Numerologies on SSB and/or Data In previous solutions, numerology-related UE capability only covers CA (both UL and DL), SSB and data, BWP and so on. Embodiments of the present disclosure, by contrast, may indicate whether the UE supports simultaneous transmission/reception to/from different cells with different uplink and downlink numerologies on SSB and/or data

Embodiment 4: When Conducting a Handover with Simultaneous Transmission/Reception to/from Source Cell and Target Cell, the Interruption Time May be Reduced (or Even not Allowed)

When conducting a handover in accordance with the embodiments described herein, the interruption time is expected to be reduced or even eliminated, based on current interruption times:

$$T_{interrupt} = T_{search} + T_{IU} + 20 \text{ ms}$$

Where:

$T_{search}$ is the time required to search the target cell when the target cell is not already known when the handover command is received by the UE. If the target cell is known, then $T_{search}=0$ ms. If the target cell is unknown and signal quality is sufficient for successful cell detection on the first attempt, then $T_{search}=80$ ms. Regardless of whether DRX is in use by the UE, $T_{search}$ shall still be based on non-DRX target cell search times.

$T_{IU}$ is the interruption uncertainty in acquiring the first available PRACH occasion in the new cell.

$T_{IU}$ can be up to 30 ms.

In another example of determining interruptions times for NR:

$$T_{interrupt} = T_{search} + T_{IU} + 20 + T_\Delta \text{ ms}$$

Where:

$T_{search}$ is the time required to search the target cell when the target cell is not already known when the handover command is received by the UE. If the target cell is known, then $T_{search}=0$ ms. If the target cell is an unknown intra-frequency cell and signal quality is sufficient for successful cell detection on the first attempt, then $T_{search}=T_{rs}+2$ ms. If the target cell is an unknown inter-frequency cell and signal quality is sufficient for successful cell detection on the first attempt, then $T_{search}=[3*T_{rs}+2]$ ms. Regardless of whether DRX is in use by the UE, $T_{search}$ shall still be based on non-DRX target cell search times.

$T_\Delta$ is time for fine time tracking and acquiring full timing information of the target cell. $T_\Delta = T_{rs}$.

$T_{IU}$ is the interruption uncertainty in acquiring the first available PRACH occasion in the new cell.

$T_{IU}$ can be up to x*10+10 ms. x is defined in the table 6.3.3.2-2 of TS 38.211 [6].

$T_{rs}$ is the SMTC periodicity of the target NR cell if the UE has been provided with an SMTC configuration for the target cell prior to or in the handover command, otherwise the requirement in this section is applied with Trs=5 ms unless the SSB transmission periodicity is not 5 ms. If UE is provided with both SMTC configuration and SSB transmission periodicity, the requirement shall be based on SMTC periodicity.

Table 5 below provides examples of parameter definitions that may be used in conjunction with embodiments of the present disclosure.

TABLE 5

| Definitions for parameters | Per | M | FDD TDD DIFF | FR1 FR2 DIFF |
|---|---|---|---|---|
| bwp-DiffNumerology<br>Indicates whether the UE supports BWP adaptation up to 4 BWPs with the different numerologies. For the UE capable of this feature, the bandwidth of a UE-specific RRC configured BWP includes the bandwidth of the initial DL BWP and SSB for PCell and PSCell. For SCell(s), the bandwidth of the UE-specific RRC configured BWP includes SSB, if there is SSB on SCell(s). | Band | No | No | No |
| bwp-SameNumerology<br>Defines type A/B BWP adaptation (up to⅔ BWPs) with the same numerology. For the UE capable of this feature, the bandwidth of a UE-specific RRC configured BWP includes the bandwidth of the initial DL BWP and SSB for PCell and PSCell. For SCell(s), the bandwidth of the UE-specific RRC configured BWP includes SSB, if there is SSB on SCell(s). | Band | No | No | No |
| crossCarrierSchedulingDL-SameSCS<br>Indicates whether the UE supports cross carrier scheduling for the same numerology in DL carrier aggregation with carrier indicator field (CIF). | Band | No | Yes | No |
| crossCarrierSchedulingUL-SameSCS<br>Indicates whether the UE supports cross carrier scheduling for the same numerology in UL carrier aggregation with carrier indicator field (CIF). | Band | No | Yes | No |
| diffNumerologyAcrossPUCCH-Group<br>Indicates whether different numerology across PUCCH groups in CA is supported by the UE. | BC | No | No | No |
| diffNumerologyWithinPUCCH-Group<br>Indicates whether UE supports different numerology across carriers within a PUCCH group and a same numerology between DL and UL per carrier for data/control channel at a given time. | BC | No | No | No |
| crossCarrierSchedulingDL-OtherSCS<br>Indicates whether the UE supports cross carrier scheduling for the different numerologies in DL carrier aggregation with carrier indicator field (CIF). | FS | No | Yes | No |

TABLE 5-continued

| Definitions for parameters | Per | M | FDD TDD DIFF | FR1 FR2 DIFF |
|---|---|---|---|---|
| supportedSubCarrierSpacingDL<br>Defines the supported sub-carrier spacing for DL by the UE indicating the UE supports simultaneous reception with same or different numerologies in CA. Note the UE shall support all mandated sub-carrier spacing for FR1/FR2. Same numerology for intra-band NR CA including both continuous and non-continuous is mandatory with capability in both FR1 and FR2. Two mixed numerologies between FR1 band(s) and FR2 band(s) in DL are mandatory with capability if UE supports inter-band NR CA including both FR1 band(s) and FR2 band(s). Optional for other cases. | FSPC | Yes/No | No | No |
| crossCarrierSchedulingUL-OtherSCS<br>Indicates whether the UE supports cross carrier scheduling for the different numerologies in UL carrier aggregation with carrier indicator field (CIF). | FS | No | Yes | No |
| twoPUCCH-Group<br>Indicates whether two PUCCH group in CA with a same numerology across CCs for data and control channel [at a given time] is supported by the UE. | FS | No | No | No |
| supportedSubCarrierSpacingUL<br>Defines the supported sub-carrier spacing for UL by the UE, indicating the UE supports simultaneous transmission with same or different numerogies in CA, or indicating the UE supports different numerologies on NR UL and SUL within one cell. Note the UE shall support all mandated sub-carrier spacing for FR1/FR2. Same numerology for intra-band NR CA including both continuous and non-continuous is mandatory with capability in both FR1 and FR2. Two mixed numerologies between FR1 band(s) and FR2 band(s) in UL are mandatory with capability if UE supports inter-band NR CA including both FR1 band(s) and FR2 band(s). Optional for other cases. | FSPC | Yes/No | No | No |
| simultaneousRxDataSSB-DiffNumerology<br>Indicates whether the UE supports concurrent intra-frequency measurement on serving cell or neighbouring cell and PDCCH or PDSCH reception from the serving cell with a different numerology. | UE | No | Yes | Yes |

In some embodiments, to extend the capability to cover a source cell and target cell, a new separate indicator could be introduced, an example of which is shown below in Table 6.

TABLE 6

| simultaneousTwoCells-DiffNumerology<br>Indicates whether the UE supports transmission and/or reception to/from two cells with different numerologies. | UE | No | Yes | Yes |
|---|---|---|---|---|

This could also be achieved by extending the current capability as depicted below in Table 7.

TABLE 7

| crossCarrierSchedulingDL-OtherSCS<br>Indicates whether the UE supports cross carrier scheduling for the different numerologies in DL carrier aggregation with carrier indicator field (CIF), or in different cells with different cell id. | FS | No | Yes | No |
|---|---|---|---|---|

FIG. 4 illustrates an architecture of a system 400 of a network in accordance with some embodiments. The system 400 is shown to include a user equipment (UE) 401 and a UE 402. The UEs 401 and 402 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 401 and 402 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 401 and 402 may be configured to connect, e.g., communicatively couple, with a radio access network (RAN) 410—the RAN 410 may be, for example, an Evolved Universal Mobile Telecommunications System (UMTS) Terrestrial Radio Access Network (E-UTRAN), a NextGen RAN (NG RAN), or some other type of RAN. The UEs 401 and 402 utilize connections 403 and 404, respectively, each of which comprises a physical communications interface or layer (discussed in further detail below); in this example, the connections 403 and 404 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 401 and 402 may further directly exchange communication data via a ProSe interface 405. The ProSe interface 405 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 402 is shown to be configured to access an access point (AP) 406 via connection 407. The connection 407 can comprise a local wireless connection, such as a connection consistent with any IEEE 802.11 protocol, wherein the AP 406 would comprise a wireless fidelity (WiFi®) router. In this example, the AP 406 is shown to be connected to the Internet without connecting to the core network of the wireless system (described in further detail below).

The RAN 410 can include one or more access nodes that enable the connections 403 and 404. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 410 may include one or more RAN nodes for providing macrocells, e.g., macro RAN node 411, and one or more RAN nodes for providing femtocells or picocells (e.g., cells having smaller coverage areas, smaller user capacity, or higher bandwidth compared to macrocells), e.g., low power (LP) RAN node 412.

Any of the RAN nodes 411 and 412 can terminate the air interface protocol and can be the first point of contact for the UEs 401 and 402. In some embodiments, any of the RAN nodes 411 and 412 can fulfill various logical functions for the RAN 410 including, but not limited to, radio network controller (RNC) functions such as radio bearer management, uplink and downlink dynamic radio resource management and data packet scheduling, and mobility management.

In accordance with some embodiments, the UEs 401 and 402 can be configured to communicate using Orthogonal Frequency-Division Multiplexing (OFDM) communication signals with each other or with any of the RAN nodes 411 and 412 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 411 and 412 to the UEs 401 and 402, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 401 and 402. The physical downlink control channel (PDCCH) may carry information about the transport format and resource allocations related to the PDSCH channel, among other things. It may also inform the UEs 401 and 402 about the transport format, resource allocation, and H-ARQ (Hybrid Automatic Repeat Request) information related to the uplink shared channel. Typically, downlink scheduling (assigning control and shared channel resource blocks to the UE 402 within a cell) may be performed at any of the RAN nodes 411 and 412 based on channel quality information fed back from any of the UEs 401 and 402. The downlink resource assignment information may be sent on the PDCCH used for (e.g., assigned to) each of the UEs 401 and 402.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). An ECCE may have other numbers of EREGs in some situations.

The RAN 410 is shown to be communicatively coupled to a core network (CN) 420—via an S1 interface 413. In embodiments, the CN 420 may be an evolved packet core (EPC) network, a NextGen Packet Core (NPC) network, or some other type of CN. In this embodiment, the S1 interface 413 is split into two parts: the S1-U interface 414, which carries traffic data between the RAN nodes 411 and 412 and the serving gateway (S-GW) 422, and the S1-mobility management entity (MME) interface 415, which is a signaling interface between the RAN nodes 411 and 412 and MMEs 421.

In this embodiment, the CN 420 comprises the MMEs 421, the S-GW 422, the Packet Data Network (PDN) Gateway (P-GW) 423, and a home subscriber server (HSS) 424. The MMEs 421 may be similar in function to the control plane of legacy Serving General Packet Radio Service (GPRS) Support Nodes (SGSN). The MMEs 421 may manage mobility aspects in access such as gateway selection and tracking area list management. The HSS 424 may comprise a database for network users, including subscription-related information to support the network entities' handling of communication sessions. The CN 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc.

The S-GW 422 may terminate the S1 interface 413 towards the RAN 410, and routes data packets between the RAN 410 and the CN 420. In addition, the S-GW 422 may be a local mobility anchor point for inter-RAN node handovers and also may provide an anchor for inter-3GPP mobility. Other responsibilities may include lawful intercept, charging, and some policy enforcement.

The P-GW 423 may terminate an SGi interface toward a PDN. The P-GW 423 may route data packets between the EPC network and external networks such as a network including the application server 430 (alternatively referred to as application function (AF)) via an Internet Protocol (IP) interface 425. Generally, the application server 430 may be an element offering applications that use IP bearer resources with the core network (e.g., UMTS Packet Services (PS) domain, LTE PS data services, etc.). In this embodiment, the P-GW 423 is shown to be communicatively coupled to an application server 430 via an IP communications interface 425. The application server 430 can also be configured to support one or more communication services (e.g., Voice-over-Internet Protocol (VoIP) sessions, PTT sessions, group communication sessions, social networking services, etc.) for the UEs 401 and 402 via the CN 420.

The P-GW 423 may further be anode for policy enforcement and charging data collection. Policy and Charging Enforcement Function (PCRF) 426 is the policy and charging control element of the CN 420. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate Quality of Service (QoS) and charging parameters. The PCRF 426 may provision this rule into a Policy and Charging Enforcement Function (PCEF) (not shown) with the appropriate traffic flow template (TFT) and QoS class of identifier (QCI), which commences the QoS and charging as specified by the application server 430.

Figure 5:
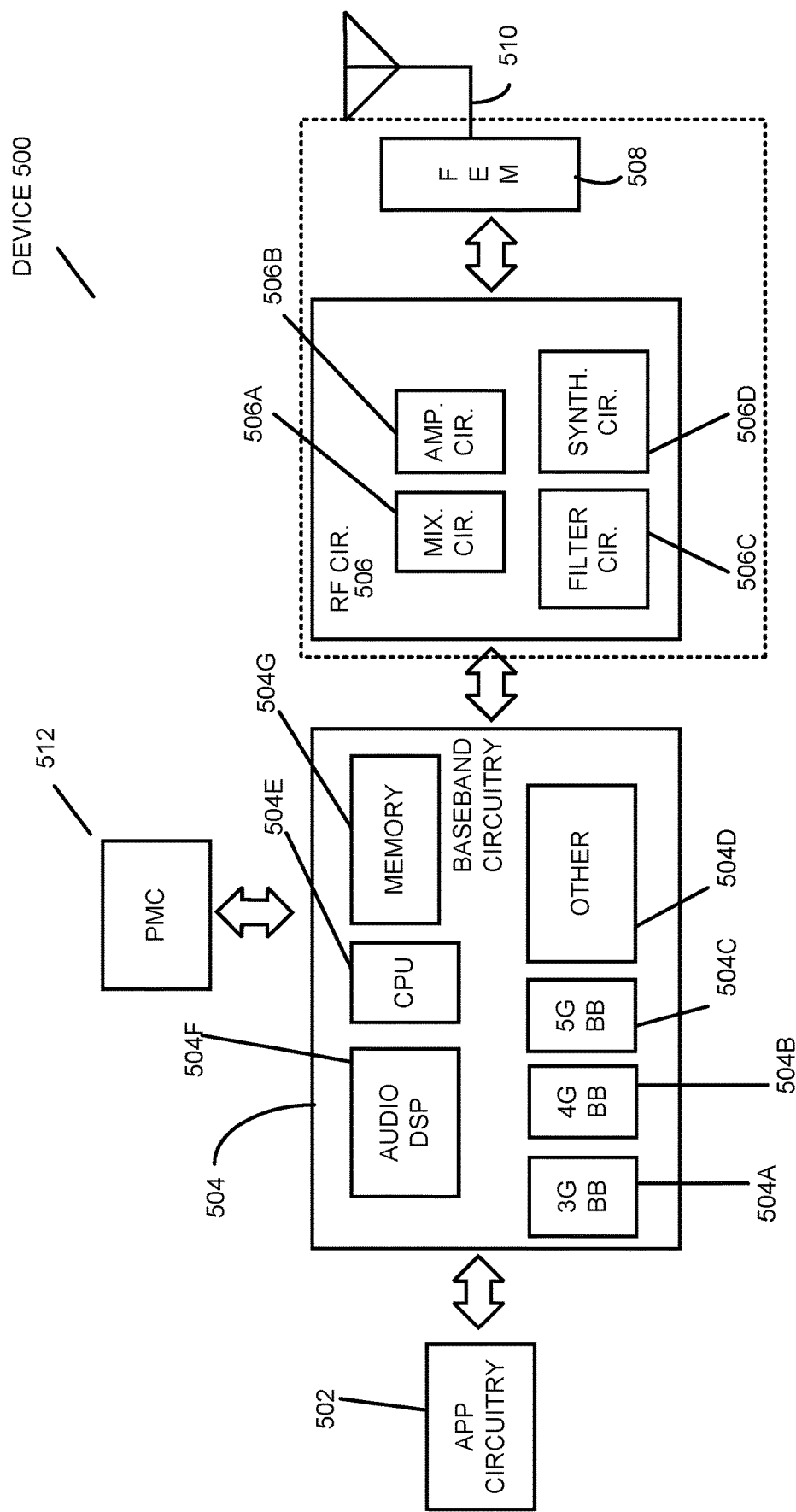
FIG. 5 depicts an example of components of a device in accordance with some embodiments.

FIG. 5 illustrates example components of a device 500 in accordance with some embodiments. In some embodiments, the device 500 may include application circuitry 502, baseband circuitry 504, Radio Frequency (RF) circuitry 506, front-end module (FEM) circuitry 508, one or more antennas 510, and power management circuitry (PMC) 512 coupled together at least as shown. The components of the illustrated device 500 may be included in a UE or a RAN node. In some embodiments, the device 500 may include fewer elements (e.g., a RAN node may not utilize application circuitry 502, and instead include a processor/controller to process IP data received from an EPC). In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 500. In some embodiments, processors of application circuitry 502 may process IP data packets received from an EPC.

The baseband circuitry 504 may include circuitry such as, but not limited to, one or more single-core or multi-core processors. The baseband circuitry 504 may include one or more baseband processors or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 504 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 504 may include Fast-Fourier Transform (FFT), precoding, or constellation mapping/demapping functionality. In some embodiments, encoding/decoding circuitry of the baseband circuitry 504 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EU- TRAN) or other wireless metropolitan area networks (WMAN), a wireless local area network (WLAN), a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the receive signal path of the RF circuitry 506 may include mixer circuitry 506a, amplifier circuitry 506b and filter circuitry 506c. In some embodiments, the transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 504 and may be filtered by filter circuitry 506c.

In some embodiments, the mixer circuitry 506a of the receive signal path and the mixer circuitry 506a of the transmit signal path may include two or more mixers and may be arranged for quadrature downconversion and upconversion, respectively. In some embodiments, the mixer circuitry 506a of the receive signal path and the mixer circuitry 506a of the transmit signal path may include two or more mixers and may be arranged for image rejection (e.g., Hartley image rejection). In some embodiments, the mixer circuitry 506a of the receive signal path and the mixer circuitry 506a of the transmit signal path may be arranged for direct downconversion and direct upconversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage controlled oscillator (VCO), although that is not a requirement. Divider control input may be provided by either the baseband circuitry 504 or the applications processor 502 depending on the desired output frequency. In some embodiments, a divider control input (e.g., N) may be determined from a look-up table based on a channel indicated by the applications processor 502.

Synthesizer circuitry 506d of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path, which may include circuitry configured to operate on RF signals received from one or more antennas 510, amplify the received signals and provide the amplified versions of the received signals to the RF circuitry 506 for further processing. FEM circuitry 508 may also include a transmit signal path, which may include circuitry configured to amplify signals for transmission provided by the RF circuitry 506 for transmission by one or more of the one or more antennas 510. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry 508 may include a receive signal path and a transmit signal path. The receive signal path of the FEM circuitry 508 may include a low noise amplifier (LNA) to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510).

In some embodiments, the PMC 512 may manage power provided to the baseband circuitry 504. In particular, the PMC 512 may control power-source selection, voltage scaling, battery charging, or DC-to-DC conversion. The PMC 512 may often be included when the device 500 is capable of being powered by a battery, for example, when the device is included in a UE. The PMC 512 may increase the power conversion efficiency while providing desirable implementation size and heat dissipation characteristics.

FIG. 5 shows the PMC 512 coupled only with the baseband circuitry 504. However, in other embodiments, the PMC 512 may be additionally or alternatively coupled with, and perform similar power management operations for, other components such as, but not limited to, application circuitry 502, RF circuitry 506, or FEM 508.

In some embodiments, the PMC 512 may control, or otherwise be part of, various power saving mechanisms of the device 500. For example, if the device 500 is in an RRC_Connected state, where it is still connected to the RAN node as it expects to receive traffic shortly, then it may enter a state known as Discontinuous Reception Mode (DRX) after a period of inactivity. During this state, the device 500 may power down for brief intervals of time and thus save power.

If there is no data traffic activity for an extended period of time, then the device 500 may transition off to an RRC_Idle state, where it disconnects from the network and does not perform operations such as channel quality feedback, handover, etc. The device 500 goes into a very low power state and it performs paging where again it periodically wakes up to listen to the network and then powers down again. The device 500 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 502 and processors of the baseband circuitry 504 may be used to execute elements of one or more instances of a protocol stack. For example, processors of the baseband circuitry 504, alone or in combination, may be used to execute Layer 3, Layer 2, or Layer 1 functionality, while processors of the application circuitry 502 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 6:
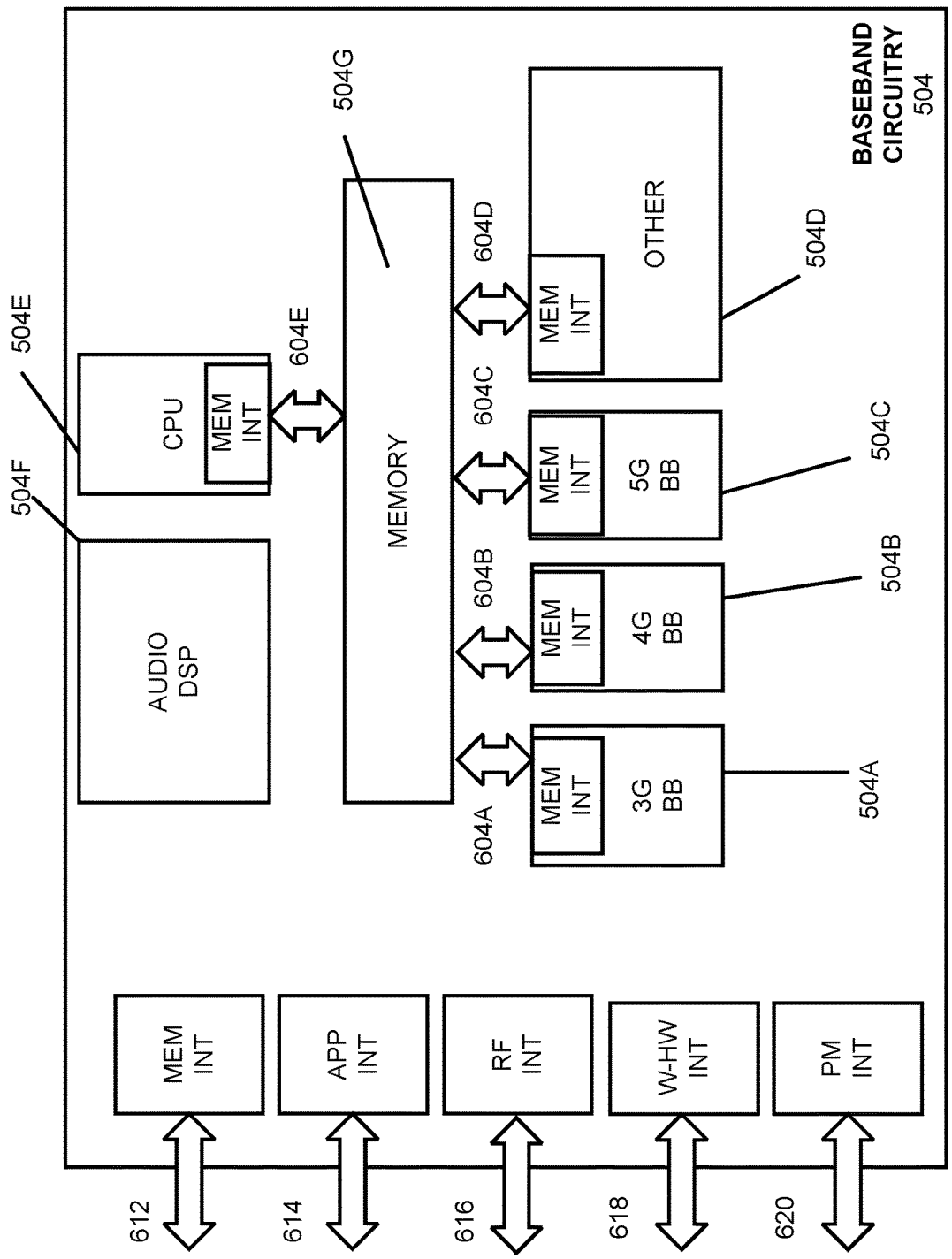
FIG. 6 depicts an example of interfaces of baseband circuitry in accordance with some embodiments.

FIG. 6 illustrates example interfaces of baseband circuitry in accordance with some embodiments. As discussed above, the baseband circuitry 504 of FIG. 5 may comprise processors 504A-504E and a memory 504G utilized by said processors. Each of the processors 504A-504E may include a memory interface, 604A-604E, respectively, to send/receive data to/from the memory 504G.

The baseband circuitry 504 may further include one or more interfaces to communicatively couple to other circuitries/devices, such as a memory interface 612 (e.g., an interface to send/receive data to/from memory external to the baseband circuitry 504), an application circuitry interface 614 (e.g., an interface to send/receive data to/from the application circuitry 502 of FIG. 5), an RF circuitry interface 616 (e.g., an interface to send/receive data to/from RF circuitry 506 of FIG. 5), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMC 512.

Figure 7:
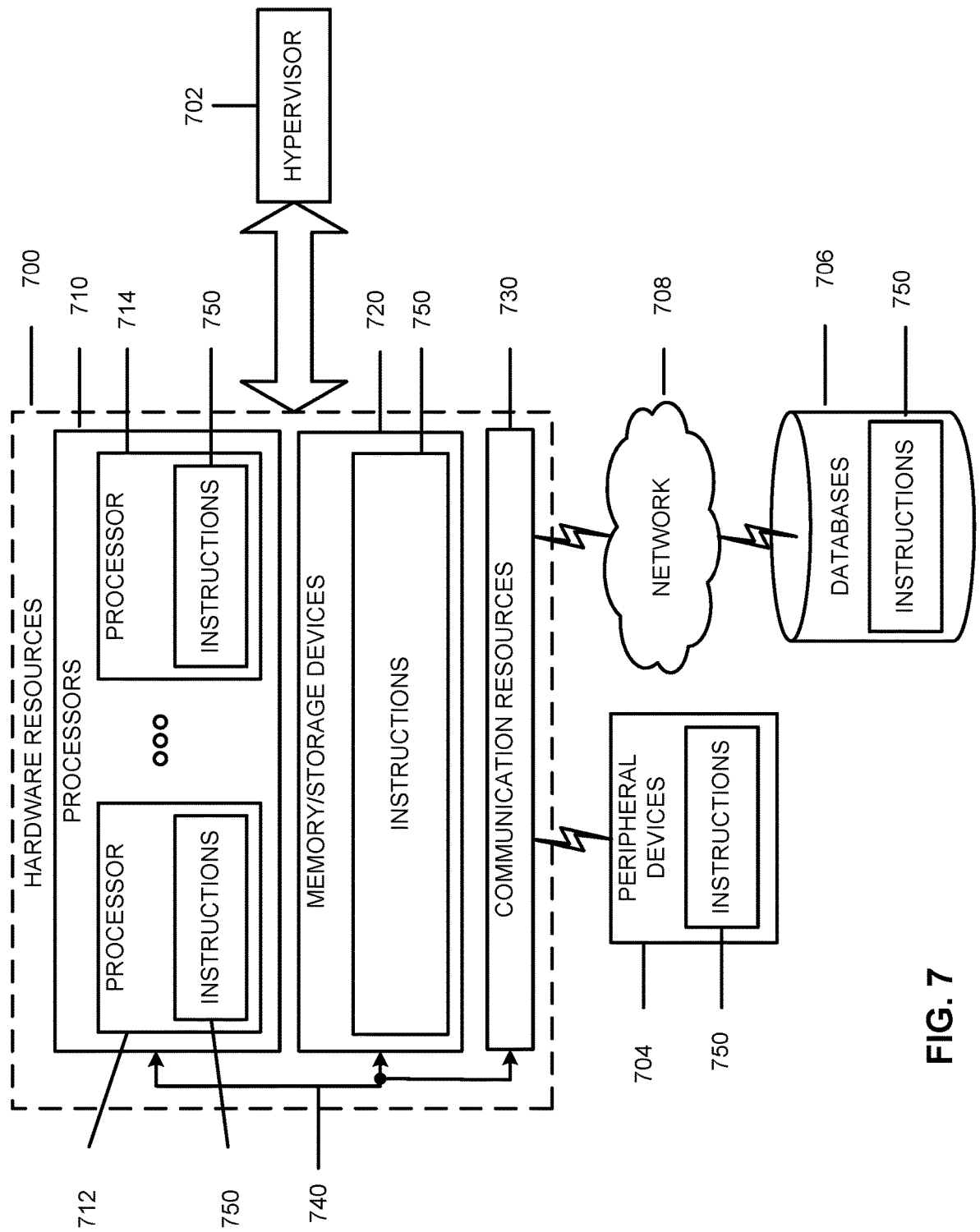
FIG. 7 depicts a block diagram illustrating components, according to some embodiments, able to read instructions from a machine-readable or computer-readable medium (e.g., a non-transitory machine-readable storage medium) and perform any one or more of the methodologies discussed herein.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (e.g., NFV) is utilized, a hypervisor 702 may be executed to provide an execution environment for one or more network slices/sub-slices to utilize the hardware resources 700.

The processors 710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

In various embodiments, the devices/components of FIGS. 4-7, and particularly the baseband circuitry of FIG. 6, may be used to practice, in whole or in part, any of the operation flow/algorithmic structures depicted in FIGS. 1-3.

One example of an operation flow/algorithmic structure is depicted in FIG. 1, which may be performed by a user equipment (UE) in accordance with some embodiments. In this example, operation flow/algorithmic structure 100 may include, at 105, retrieving, from memory, information regarding a capability of a UE to support simultaneous communication with different cells. Operation flow/algorithmic structure 100 may further include, at 110, generating, based on the information, a message that includes an indication of whether the UE supports simultaneous communication with different cells. Operation flow/algorithmic structure 100 may further include, at 115, encoding the message for transmission to a next-generation NodeB (gNB).

Another example of an operation flow/algorithmic structure is depicted in FIG. 2, which may be performed by a gNB in accordance with some embodiments. In this example, operation flow/algorithmic structure 200 may include, at 205, receiving a first message from a user equipment (UE) that includes an indication of whether the UE supports simultaneous communication with different cells. Operation flow/algorithmic structure 200 may further include, at 210, generating, based on the indication of whether the UE supports simultaneous communication with different cells, a second message that includes configuration information for a handover to be performed by the UE. Operation flow/algorithmic structure 200 may further include, at 215, encoding the second message for transmission to the UE.

Another example of an operation flow/algorithmic structure is depicted in FIG. 3, which may be performed by a UE in accordance with some embodiments. In this example, operation flow/algorithmic structure 300 may include, at 305, generating a message that includes an indication of whether the UE supports simultaneous communication with different cells. Operation flow/algorithmic structure 300 may further include, at 310, encoding the message for transmission to a gNB.

EXAMPLES

Some non-limiting examples are provided below.

Example 1 includes an apparatus of a user equipment (UE) comprising: memory to store information regarding a capability of the UE to support simultaneous communication with different cells; and processing circuitry, coupled with the memory, to: retrieve the information from the memory; generate, based on the information, a message that includes an indication of whether the UE supports simultaneous communication with different cells; and encode the message for transmission to a next-generation NodeB (gNB).

Example 2 includes the apparatus of example 1 or some other example herein, wherein the information is to indicate: whether the UE supports transmission to two or more different cells, or whether the UE supports reception from two or more different cells.

Example 3 includes the apparatus of example 1 or some other example herein, wherein the information is further to indicate a capability of the UE for intra-frequency communication or inter-frequency communication.

Example 4 includes the apparatus of example 1 or some other example herein, wherein the information is further to indicate a capability of the UE for intra-band communication or inter-band communication.

Example 5 includes the apparatus of example 1 or some other example herein, wherein the information is further to indicate a capability of the UE for sub-6 GHz (FR1) communication or mm wave (FR2) communication.

Example 6 includes the apparatus of example 1 or some other example herein, wherein the information is further to indicate a capability of the UE for communication using a unified numerology or mixed numerologies.

Example 7 includes the apparatus of example 1 or some other example herein, wherein the information is further to indicate a capability of the UE for communication using different transmission (Tx) or reception (Rx) beams simultaneously.

Example 8 includes ne or more computer-readable media storing instructions that, when executed by one or more processors, cause a next-generation NodeB (gNB) to: receive a first message from a user equipment (UE) that includes an indication of whether the UE supports simultaneous communication with different cells; generate, based on the indication of whether the UE supports simultaneous communication with different cells, a second message that includes configuration information for a handover to be performed by the UE; and encode the second message for transmission to the UE.

Example 9 includes the one or more computer-readable media of example 8 or some other example herein, wherein the indication of whether the UE supports simultaneous communication with different cells includes an indication of: whether the UE supports transmission to two or more different cells, or whether the UE supports reception from two or more different cells.

Example 10 includes the one or more computer-readable media of example 8 or some other example herein, wherein the indication of whether the UE supports simultaneous communication with different cells includes an indication of: a capability of the UE for intra-frequency communication or inter-frequency communication.

Example 11 includes the one or more computer-readable media of example 8 or some other example herein, wherein the indication of whether the UE supports simultaneous communication with different cells includes an indication of: a capability of the UE for intra-band communication or inter-band communication.

Example 12 includes the one or more computer-readable media of example 8 or some other example herein, wherein the indication of whether the UE supports simultaneous communication with different cells includes an indication of: a capability of the UE for sub-6 GHz (FR1) communication or mm wave (FR2) communication.

Example 13 includes the one or more computer-readable media of example 8 or some other example herein, wherein the indication of whether the UE supports simultaneous communication with different cells includes an indication of: a capability of the UE for communication using a unified numerology or mixed numerologies.

Example 14 includes the one or more computer-readable media of example 8 or some other example herein, wherein the indication of whether the UE supports simultaneous communication with different cells includes an indication of: a capability of the UE for communication using different transmission (Tx) or reception (Rx) beams simultaneously.

Example 15 includes one or more computer-readable media storing instructions that, when executed by one or more processors, cause a user equipment (UE) to:

generate a message that includes an indication of whether the UE supports simultaneous communication with different cells; and encode the message for transmission to a next-generation NodeB (gNB).

Example 16 includes the one or more computer readable media of example 15 or some other example herein, wherein the message is further to indicate: whether the UE supports transmission to two or more different cells, or whether the UE supports reception from two or more different cells.

Example 17 includes the one or more computer readable media of example 15 or some other example herein, wherein the message is further to indicate a capability of the UE for: intra-frequency communication, inter-frequency communication, intra-band communication, or inter-band communication.

Example 18 includes the one or more computer readable media of example 15 or some other example herein, wherein the message is further to indicate a capability of the UE for sub-6 GHz (FR1) communication or mm wave (FR2) communication.

Example 19 includes the one or more computer readable media of example 15 or some other example herein, wherein the message is further to indicate a capability of the UE for communication using a unified numerology or mixed numerologies.

Example 20 includes the one or more computer readable media of example 15 or some other example herein, wherein the message is further to indicate a capability of the UE for communication using different transmission (Tx) or reception (Rx) beams simultaneously.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, and/or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a method of communicating in a wireless network as shown and described herein.

Example 27 may include a system for providing wireless communication as shown and described herein.

Example 28 may include a device for providing wireless communication as shown and described herein.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. A user equipment (UE), comprising:
   memory that stores information regarding a capability of the UE to support simultaneous communication with different cells, the different cells comprising a source cell and a target cell;
   radio frequency (RF) circuitry configured to transmit and receive RF signals for wireless communication; and
   processing circuitry, coupled with the memory and the RF circuitry, configured to execute instructions stored in the memory, wherein the instructions, when executed by the processing circuitry, cause the processing circuitry to:
   retrieve the information from the memory;
   generate, based on the information, a message that includes an indication of whether the UE supports the simultaneous communication with the different cells;
   encode the message for transmission to a network node via the source cell before a handover procedure from the source cell to the target cell is configured by the network node;
   transmit, using the RF circuitry, the message to the network node via the source cell before the handover procedure is configured by the network node; and
   perform, using the RF circuitry, the handover procedure according to the indication in the message.

2. The UE of claim 1, wherein the information comprises:
   information to indicate whether the UE supports transmission to two or more different cells; or
   information to indicate whether the UE supports reception from the two or more different cells.

3. The UE of claim 1, wherein the information comprises information to indicate a capability of the UE for intra-frequency communication or inter-frequency communication.

4. The UE of claim 1, wherein the information comprises information to indicate a capability of the UE for intra-band communication or inter-band communication.

5. The UE of claim 1, wherein the information comprises information to indicate a capability of the UE for sub-6 GHz (FR1) communication or mm wave (FR2) communication.

6. The UE of claim 1, wherein the information comprises information to indicate a capability of the UE for communication using a unified numerology or mixed numerologies.

7. The UE of claim 1, wherein the information comprises information to indicate a capability of the UE for communication using different transmission (Tx) or reception (Rx) beams simultaneously.

8. One or more non-transitory computer-readable media storing instructions that, when executed by one or more processors, cause a network node to:
receive a first message from a user equipment (UE) via a source cell before configuring the UE to perform a handover procedure between the source cell and a target cell, the first message including an indication of whether the UE supports simultaneous communication with different cells, the different cells comprising the source cell and the target cell;
generate, based on the indication of whether the UE supports the simultaneous communication with the different cells, a second message that includes configuration information for the handover from the source cell to the target cell to be performed by the UE; and
encode the second message for transmission to the UE.

9. The one or more non-transitory computer-readable media of claim 8, wherein the indication of whether the UE supports simultaneous communication with different cells comprises:
an indication of whether the UE supports transmission to two or more different cells, or
an indication of whether the UE supports reception from the two or more different cells.

10. The one or more non-transitory computer-readable media of claim 8, wherein the indication of whether the UE supports simultaneous communication with different cells comprises an indication of a capability of the UE for intra-frequency communication or inter-frequency communication.

11. The one or more non-transitory computer-readable media of claim 8, wherein the indication of whether the UE supports simultaneous communication with different cells includes an indication of: a capability of the UE for intra-band communication or inter-band communication.

12. The one or more non-transitory computer-readable media of claim 8, wherein the indication of whether the UE supports simultaneous communication with different cells comprises an indication of a capability of the UE for sub-6 GHz (FR1) communication or mm wave (FR2) communication.

13. The one or more non-transitory computer-readable media of claim 8, wherein the indication of whether the UE supports simultaneous communication with different cells comprises an indication of a capability of the UE for communication using a unified numerology or mixed numerologies.

14. The one or more non-transitory computer-readable media of claim 8, wherein the indication of whether the UE supports simultaneous communication with different cells comprises an indication of a capability of the UE for communication using different transmission (Tx) or reception (Rx) beams simultaneously.

15. One or more non-transitory computer-readable media storing instructions that, when executed by one or more processors, cause a user equipment (UE) to:
generate a message that includes an indication of whether the UE supports simultaneous communication with different cells, the different cells comprising a source cell and a target cell;
encode and transmit the message to a network node via the source cell before a handover procedure from the source cell to the target cell is configured by the network node; and
perform the handover procedure according to the indication in the message.

16. The one or more non-transitory computer readable media of claim 15, wherein the message further comprises:
an indication whether the UE supports transmission to two or more different cells, or
an indication whether the UE supports reception from the two or more different cells.

17. The one or more non-transitory computer readable media of claim 15, wherein the message further comprises an indication of a capability of the UE for: intra-frequency communication, inter-frequency communication, intra-band communication, or inter-band communication.

18. The one or more non-transitory computer readable media of claim 15, wherein the message further comprises an indication of a capability of the UE for sub-6 GHz (FR1) communication or mm wave (FR2) communication.

19. The one or more non-transitory computer readable media of claim 15, wherein the message further comprises an indication of a capability of the UE for communication using different transmission (Tx) or reception (Rx) beams simultaneously.

* * * * *